United States Patent
Eaton et al.

(10) Patent No.: US 7,412,267 B2
(45) Date of Patent: Aug. 12, 2008

(54) MOBILE DEVICE WITH A COMBINATION ATTACHMENT AND ACOUSTIC PORT

(75) Inventors: Chris Eaton, Cary, NC (US); Matt Murray, Raleigh, NC (US)

(73) Assignee: Sony Ericsson Mobile Communications AB (SE)

( * ) Notice: Subject to any disclaimer, the term of this patent is extended or adjusted under 35 U.S.C. 154(b) by 470 days.

(21) Appl. No.: 10/696,864

(22) Filed: Oct. 30, 2003

(65) Prior Publication Data
US 2005/0096103 A1 May 5, 2005

(51) Int. Cl.
 H04M 1/00 (2006.01)
 H04R 1/02 (2006.01)
 H04R 5/02 (2006.01)
 H04R 9/06 (2006.01)

(52) U.S. Cl. .................. 455/575.1; 455/575.6; 381/87; 381/300; 381/305; 381/311; 381/334; 381/360; 381/386; 381/391; 381/395

(58) Field of Classification Search .............. 455/575.6, 455/575.1; 381/300–305, 308, 311, 333, 381/334, 356–389, 391, 87, 395, 345; D3/218
See application file for complete search history.

(56) References Cited

U.S. PATENT DOCUMENTS

| | | | | |
|---|---|---|---|---|
| 4,450,495 A * | 5/1984 | Naruki | .................. | 360/137 |
| 4,901,355 A * | 2/1990 | Moore | .................. | 381/381 |
| 5,164,987 A * | 11/1992 | Raven | .................. | 381/309 |
| 5,331,760 A * | 7/1994 | DuMont | .................. | 43/17.1 |
| 5,613,237 A | 3/1997 | Bent et al. | | |
| 5,753,838 A * | 5/1998 | Vanga, II | .................. | 84/297 R |
| 5,887,776 A * | 3/1999 | Munoz | .................. | 224/575 |
| 5,898,363 A * | 4/1999 | Altilio | .................. | 340/384.1 |
| 6,148,080 A | 11/2000 | Collin | | |
| 6,374,090 B1 * | 4/2002 | Morales | .................. | 455/90.1 |
| 6,952,617 B1 * | 10/2005 | Kumar | .................. | 700/1 |
| 2004/0244566 A1 * | 12/2004 | Steiger | .................. | 84/610 |
| 2005/0075082 A1 * | 4/2005 | Iwai et al. | .................. | 455/90.3 |

FOREIGN PATENT DOCUMENTS

| | | |
|---|---|---|
| EP | 1300959 | 4/2003 |
| WO | WO98/31129 | 7/1998 |
| WO | WO 01/06344 A1 * | 1/2001 |

OTHER PUBLICATIONS

Patent Abstracts of Japan, vol. 0184, No. 67; Aug. 30, 1994.
International Search Report and The Written Opinion relating to PCT/IB2004/001493 filed May 10, 2004.

* cited by examiner

Primary Examiner—William Trost
Assistant Examiner—Marivelisse Santiago
(74) Attorney, Agent, or Firm—Coats & Bennett, P.L.L.C.

(57) ABSTRACT

A method and apparatus for combining an attachment and acoustic port on a housing of a mobile device is disclosed herein. The mobile device includes a speaker disposed within the housing. A combined attachment and acoustic port disposed on the housing is configured to project audible sound from the speaker, via an acoustic channel, and includes an attachment member for attaching an external member to the mobile device. The mobile device may comprise any personal electronic device, such as a portable radio, cassette player, CD player, or MP3 player. Further, the mobile device may comprise a mobile communication device, such as a cellular telephone, pager, or PDA.

25 Claims, 4 Drawing Sheets

MOBILE DEVICE WITH A COMBINATION ATTACHMENT AND ACOUSTIC PORT

BACKGROUND OF THE INVENTION

The present invention relates to mobile devices and more particularly to mobile devices that combine external features to reduce mobile device size.

The increasing popularity of mobile devices, such as cellular telephones, Portable Digital Assistants (PDA), MP3 players, etc., is due in part to their small size and portability. Despite the significant reductions in mobile device size over the past decade, consumers still demand increasingly smaller mobile devices. To address this demand, manufacturers spend considerable resources each year exploring new ways to reduce the size of their mobile devices.

One solution includes reducing the number of external ports positioned on the housing of a mobile device by combining the functionality of two or more ports into a single port. By eliminating one or more external ports, designers may be able to conserve space, and therefore, may be able to reduce the size of the mobile device.

SUMMARY OF THE INVENTION

The present invention discloses a method and apparatus for combining an attachment and acoustic port on a housing of a mobile device. The mobile device includes a speaker disposed within the housing. A combined attachment and acoustic port disposed on the housing is configured to project audible sound from the speaker. Further, the combination attachment and acoustic port includes an attachment member for attaching an external member to the mobile device.

In one embodiment, the mobile device comprises a combination attachment and acoustic port formed at least partially in the housing. The combination attachment and acoustic port includes at least one attaching bar extending across the port for connecting an external member. The attaching bar is spaced with respect to the port such that an open area is defined around the attaching bar that is of sufficient size to allow the external member to be attached around the attaching bar. The combination and acoustic port also projects sound from a speaker positioned within the mobile device.

DETAILED DESCRIPTION OF THE INVENTION

Figure 1:
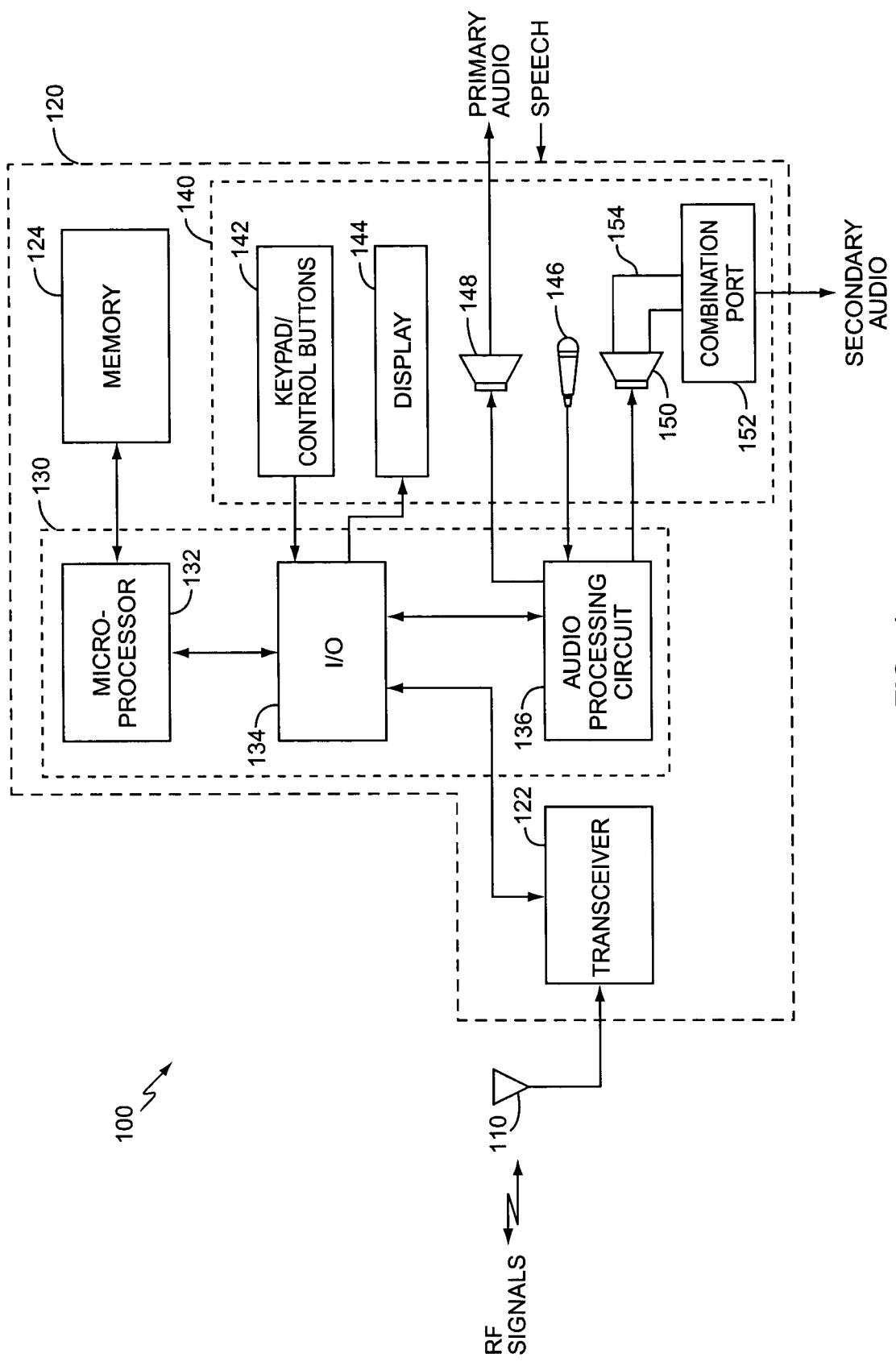
FIG. 1 illustrates a block diagram of an exemplary mobile device according to the present invention.
Figure 2A:
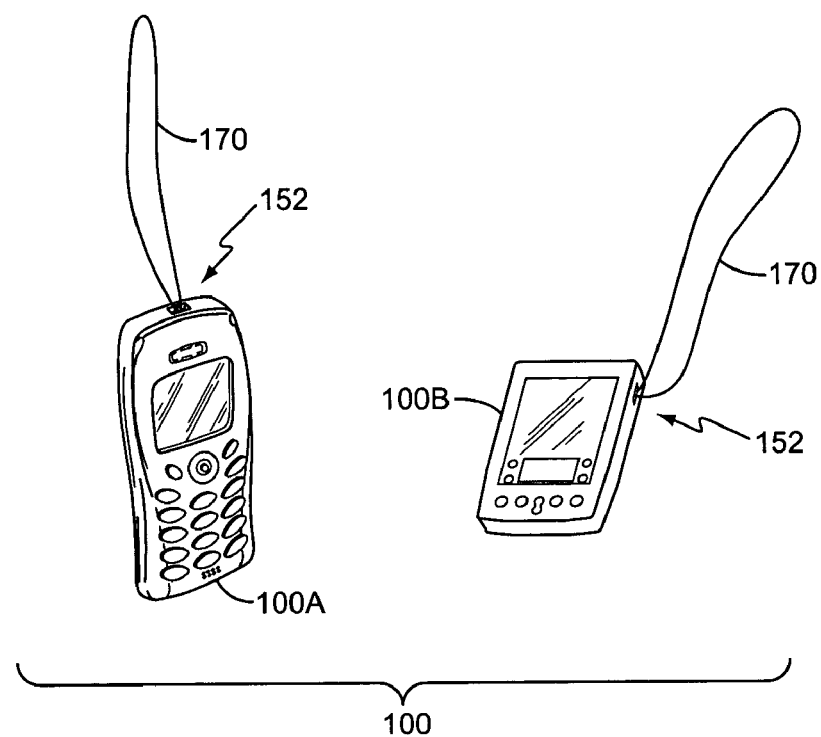
FIG. 2A illustrates various mobile communication devices according to the present invention.
Figure 2B:
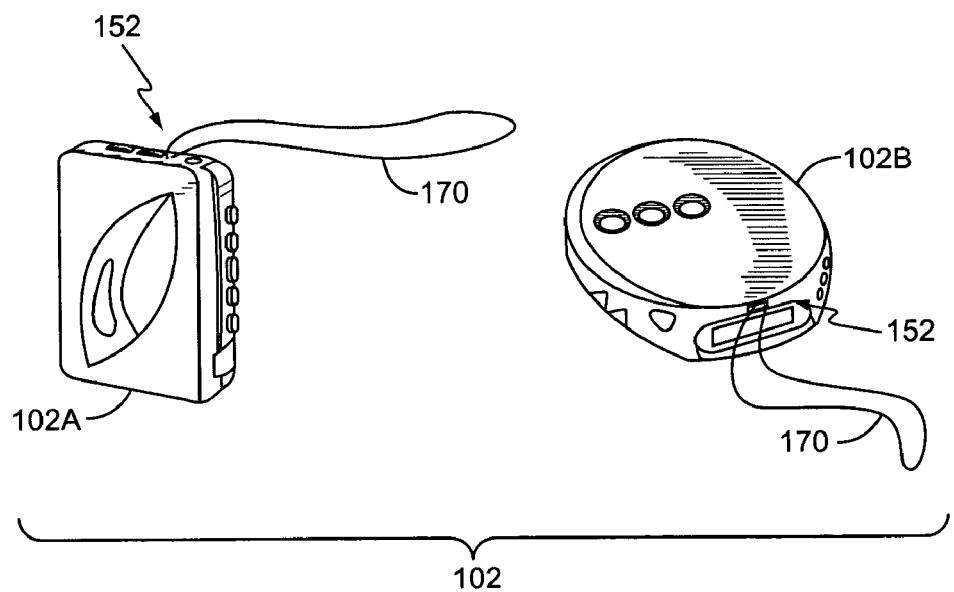
FIG. 2B illustrates various portable electronic devices according to the present invention.

Mobile devices utilized with the present invention may comprise any known mobile communication device or portable electronic device. FIG. 1 illustrates a block diagram of an exemplary mobile communication device 100 according to the present invention. As used herein, the term "mobile communication device" may include cellular telephones 100a, satellite telephones, personal communication services (PCS) devices, personal data assistants (PDAs) 100b, palm-top computers, pagers, and the like, some of which are illustrated in FIG. 2A. While the present invention is described in terms of a mobile communication device 100, those skilled in the art will appreciate that the present invention is not limited to mobile communication devices 100. For example, the present invention may also be embodied in other mobile devices, such as portable electronic devices 102, including portable radios, cassette players 102a, compact disc players and/or mini-disc player 102b, MP3 players, and the like (see FIG. 2B). As such, those skilled in the art will understand that mobile devices, as described herein, include mobile communication devices 100 and portable electronic devices 102.

Mobile communication device 100 comprises an antenna 110 and a communication circuit 120. Antenna 110 transmits and receives radio signals according to any means known in the art. Communication circuit 120 comprises input/output circuit 134, transceiver 122, memory 124, microprocessor 132, audio processing circuit 136, and user interface 140. Input/output circuit 134 interfaces microprocessor 132, transceiver 122, audio processing circuit 136, and user interface 140 according to any means known in the art. Audio processing circuit 136 provides basic analog output signals to speakers 148, 150 and accepts analog audio inputs from microphone 146. Transceiver 122, coupled to antenna 110, is a fully functional cellular radio transceiver, which may operate according to any known standard, including the standards known generally as the Global System for Mobile Communications (GSM), TIA/EIA-136, cdmaOne, cdma2000, UMTS, and Wideband CDMA.

Microprocessor 132 controls the operation of mobile communication device 100 according to programs stored in memory 124. The control functions of microprocessor 132 may be implemented in a single microprocessor or in multiple microprocessors. Suitable microprocessors may include, for example, both general purpose and special purpose microprocessors and digital signal processors. Memory 124 represents the entire hierarchy of memory in a mobile communication device 100, and may include both random access memory (RAM) and read-only memory (ROM). Computer program instructions and data required for operation are stored in non-volatile memory, such as EPROM, EEPROM, and/or flash memory, which may be implemented as discrete devices, stacked devices, or integrated with microprocessor 132. As shown in FIG. 1, microprocessor 132, input/output circuit 134, and/or audio processing circuit 136 may be incorporated into a specially designed application-specific integrated circuit (ASIC) 130. While not shown, ASIC 130 may also include memory 124

User interface 140 includes keypad 142, display 144, microphone 146, primary speaker 148, secondary speaker 150, a combination attachment and acoustic port, herein referred to as combination port 152, and an acoustic channel 154. Keypad 142 enables the user to dial numbers, enter commands, and select options via an alphanumeric keypad and, optionally, a navigation control, such as a joystick control, as is known in the art. Display 144 allows the user to see dialed digits, images, called status, menu options, and other service information.

Microphone 146 converts the user's speech into electrical audio signals. Primary speaker 148 converts electrical audio signals, such as speech signals from a far-end user, into audible signals that can be heard by the user. Secondary speaker 150 converts electrical audio signals, such as high-level voice audio, and/or notification signals, i.e., a ring or an alarm, to audible signals that are routed to the user via the acoustic channel 154 and combination port 152, as described further below. While FIG. 1 illustrates primary speaker 148 and secondary speaker 150 as two separate speakers, those skilled in the art will understand that primary and secondary speakers 148, 150 may be combined into a single speaker.

Figure 3:
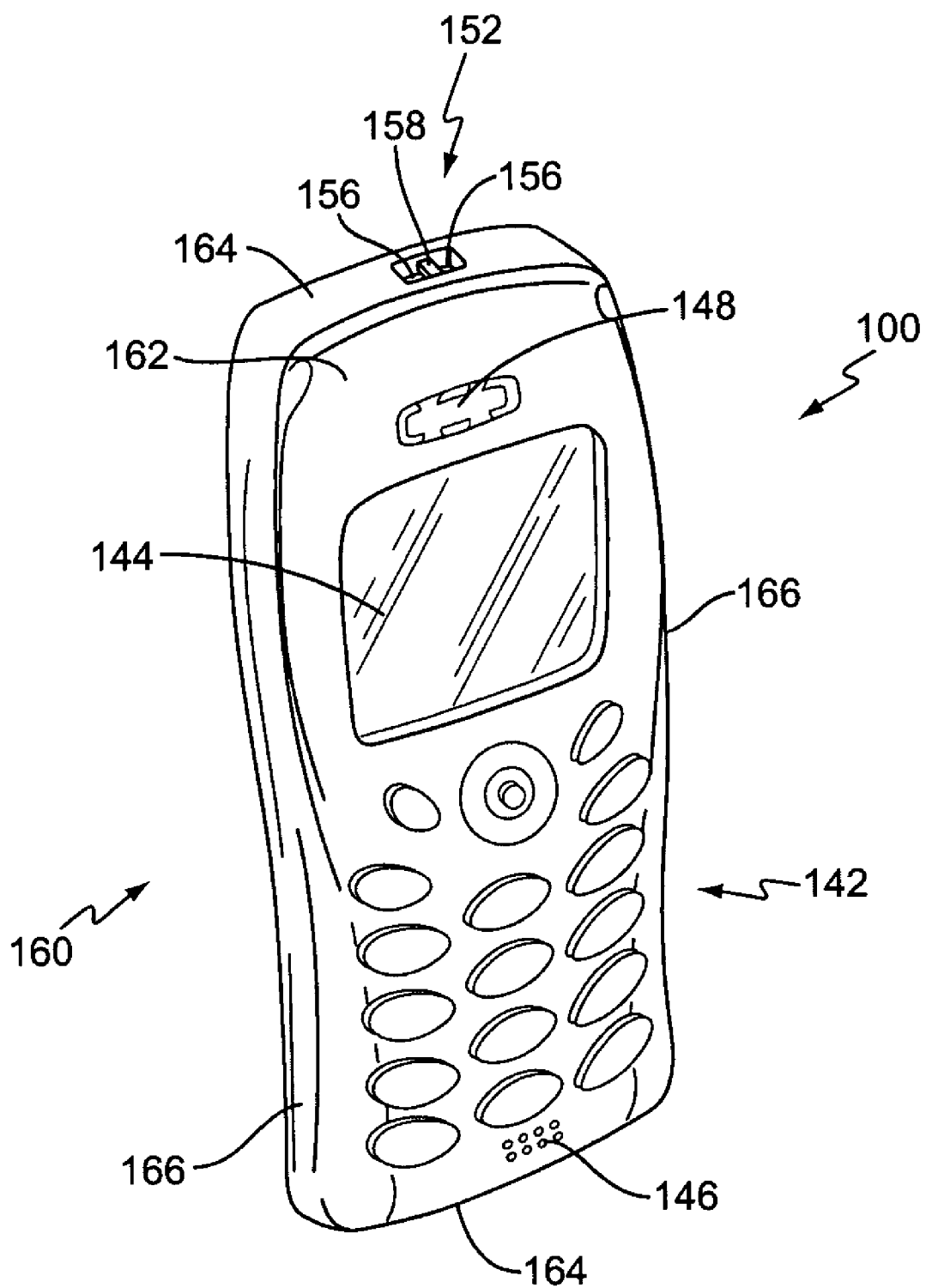
FIG. 3 illustrates a perspective view of an exemplary mobile device as seen from the front.

FIG. 3 illustrates an exemplary mobile communication device 100 according to the present invention. Mobile communication device 100 includes a housing 160 having a front 162, a back (not shown), and an outer edge that connects front 162 to the back and includes top and bottom ends 164 and right and left sides 166. Further, mobile communication device 100 includes keypad 142, display 144, an input port for microphone 146, an output port for primary speaker 148, and a combination port 152. Keypad 142, display 144, the output port for primary speaker 148, and the input port for microphone 146 are disposed on the front 162 of housing 160, and operate as described above.

Combination port 152 operates as an output port for secondary speaker 150, as described above, and may be disposed anywhere on housing 160. In preferred embodiments, combination port 152 is at least partially formed on an outer edge of housing 160. As shown in FIG. 3, an exemplary mobile communication device 100 may include a combination port 152 on a top end 164 of a mobile device. Alternatively, as shown in FIG. 2A, combination port 152 may be formed on a side 166 of a mobile device.

Figure 4A:
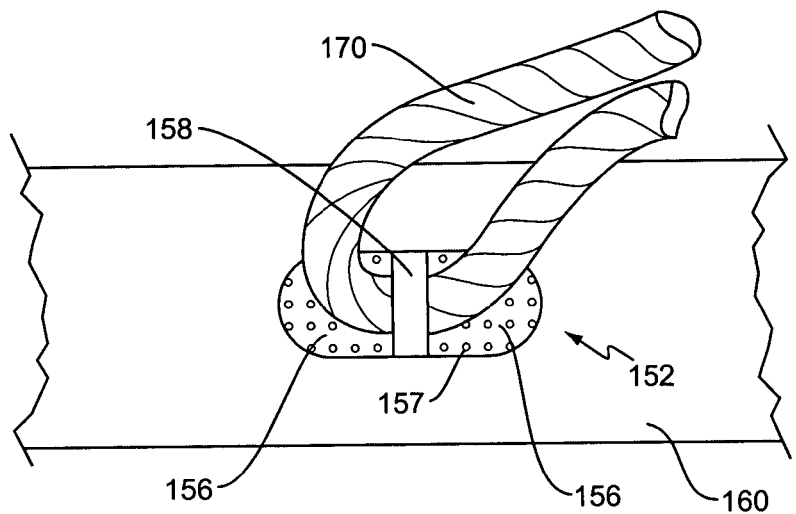
FIG. 4A illustrates a top view of an exemplary combination port according to the present invention.
Figure 4B:
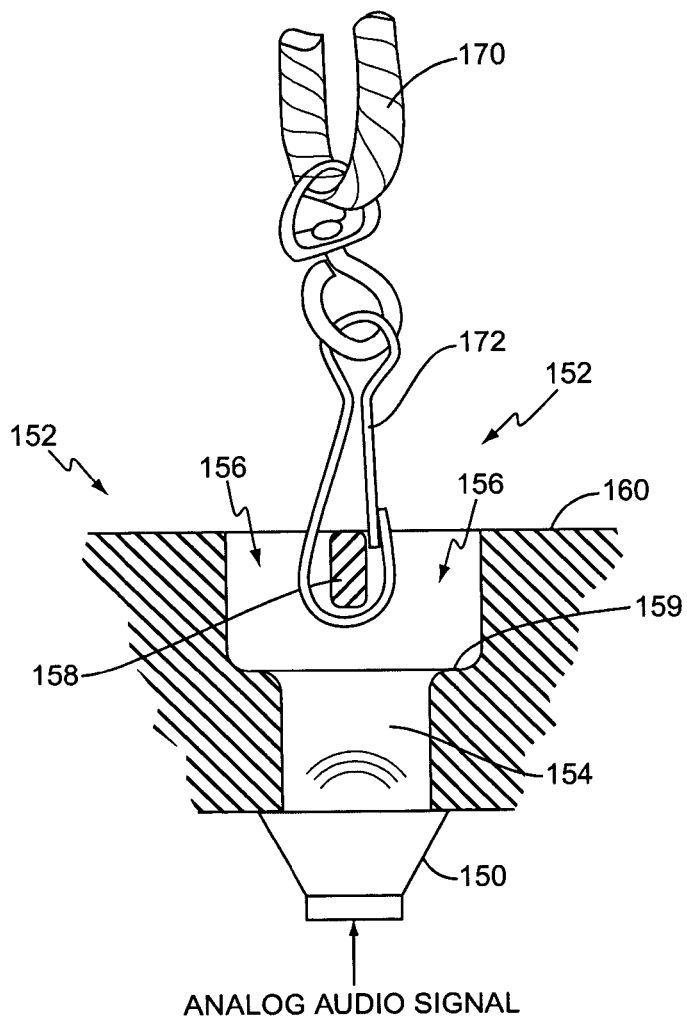
FIG. 4B illustrates a cross-sectional view of the combination port of FIG. 4A.

FIGS. 4A and 4B provide further details of an exemplary combination port 152 according to the present invention. In the illustrated embodiment, combination port 152 comprises an opening or recess 156 formed in the housing 160. The opening typically includes one or more speaker holes 157 for projecting audible sound. Further, combination port 152 includes a support member 158. While FIG. 4A illustrates a single rigid support member 158 positioned in combination port 152, those skilled in the art will appreciate that multiple rigid support members 158 may be positioned in combination port 152. Further, the present invention is not limited to the rigid support member 158 shown; other types of attachment members or attaching bars suitable for attaching external members may be included in combination port 152.

FIG. 4B shows a cross-section of the combination port 152 of FIG. 4A. Support member 158 is positioned within recess 156 such that the support member 158 spans recess 156 and is spaced from the edges 159 of recess 156. As shown in FIG. 4B, the spacing between the edges 159 of recess 156 and support member 158 provides sufficient space for an end of an external member, such as a spring clip 172 on a lanyard 170, to extend around support member 158. While FIG. 4B illustrates a spring clip 172 secured around support member 158, those skilled in the art will recognize that support member 158 may be spaced from the edges 159 of the recess 156 to accommodate any known strap, clip, or the like. Further, those skilled in the art will appreciate that the support member 158 may be used to attach any known external member to the mobile device. Such external members may include lanyards, straps, clips, key rings, handles, and the like.

FIG. 4B also shows an acoustic channel 154 disposed between secondary speaker 150 and combination port 152. As discussed above, combination port 152 projects audible sound from secondary speaker 150. Further, acoustic channel 154 routes the audible sound projected by secondary speaker 150 to combination port 152. While not shown, acoustic channel 154 may include acoustic impedance matching elements to match the acoustic impedance of secondary speaker 150 to the acoustic impedance of the environment external to combination port 152.

Those skilled in the art will appreciate that the present invention is not limited to the acoustic channel configurations shown in FIGS. 1 and 4B; any configuration known in the art may be utilized. For example, acoustic channel 154 may assume a conical shape to better project audible sounds from the speaker 150 to combination port 152. Further, as shown in FIG. 1, the acoustic channel 154 may include one or more bends to better accommodate spacing requirements.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A mobile device comprising:

a housing;

a speaker disposed within the housing for projecting audible signals from the mobile device; and an acoustic port comprising an opening disposed in the housing and configured to project audible sound from the speaker through the opening; and an attachment member spanning the opening of said acoustic port for attaching an external strap to the mobile device, wherein the attachment member comprises a support bar disposed in the opening and spaced from the housing to enable a spring clip disposed on one end of the external strap to extend between the support bar and the housing.

2. The mobile device of claim 1 wherein the support bar comprises a rigid material spanning the opening.

3. The mobile device of claim 1 further comprising an acoustic channel disposed within the mobile device between the speaker and the acoustic port to acoustically connect the speaker to the acoustic port.

4. The mobile device of claim 1 wherein the speaker projects high-level voice audio via the acoustic port.

5. The mobile device of claim 1 wherein the speaker projects notification signals via the acoustic port.

6. The mobile device of claim 1 wherein the mobile device comprises at least one of a portable radio, a portable cassette player, a portable CD player, a portable mini-disc player, and a portable MP3 player.

7. The mobile device of claim 1 further comprising a communication circuit disposed within the housing for transmitting and receiving signals.

8. The mobile device of claim 7 wherein the mobile device comprises at least one of a cellular telephone, a personal data assistant, a pager, and a personal communications system.

9. The mobile device of claim 1 wherein the acoustic port is disposed in an outer edge of the housing.

10. The mobile device of claim 1 wherein the attachment member is disposed in the opening such that the attachment member is flush with the housing or disposed below an outer edge of the housing.

11. A method of outputting audible signals from a mobile device comprising a housing and a speaker for projecting the audible signals disposed within the housing, the method comprising:

providing a recessed acoustic port in at least a portion of the housing to project acoustic sound from the mobile device, said acoustic port comprising an opening disposed in at least a portion of the housing; and placing an attachment member in the opening for attaching an external strap to the mobile device, wherein placing the attachment member in the opening comprises spanning the attachment member across the opening of the recessed acoustic port and spaced with respect to a back portion of the recessed acoustic port a sufficient amount to enable a spring clip disposed on one end of the external strap to extend between the support bar and the back portion of the recessed acoustic port.

12. The method of claim 11 further comprising providing an acoustic channel within the mobile device between the speaker and the acoustic port to direct the audible signals from the speaker to the acoustic port.

13. The method of claim 11 wherein placing the attachment member in the opening comprises placing the attachment member within the opening such that the attachment member is flush with the housing of disposed below an outer edge of the housing.

14. A mobile device comprising at least one of a cellular telephone, a personal data assistant, a pager, and a personal communication system, the mobile device comprising:
 a housing;
 an acoustic port comprising an opening formed at least partially in the housing and including a surrounding wall structure;
 at least one attaching bar extending across the opening for connecting to an external strap, wherein the attaching bar is spaced with respect to the port such that an open area around the attaching bar is of a sufficient size to allow a spring clip disposed on one end of the external strap to extend between the attaching bar and the housing;
 a speaker positioned within the mobile device with respect to the acoustic port for directing sound through the acoustic port and out of the mobile device via the opening; and
 a communication circuit disposed within the housing for transmitting and receiving communication signals.

15. The mobile device of claim 14 wherein the attaching bar comprises a rigid material.

16. The mobile device of claim 14 further comprising an acoustic channel disposed within the mobile device between the speaker and the acoustic port to direct sound through the acoustic port and out of the mobile device.

17. The mobile device of claim 14 wherein the speaker directs high-level voice audio out of the mobile device via the acoustic port.

18. The mobile device of claim 14 wherein the speaker projects notification signals out of the mobile device via the acoustic port.

19. The mobile device of claim 14 wherein the acoustic port is disposed in an outer edge of the housing.

20. The mobile device of claim 14 wherein the attaching bar is disposed in the opening such that the attachment member is flush with the housing or disposed below an outer edge of the housing.

21. A mobile device comprising at least one of a cellular telephone, a personal data assistant, a pager, and a personal communication system, the mobile device comprising:
 a housing;
 a port comprising an opening disposed at least partially in the housing, said port comprising:
  projecting means for projecting audible signals from the mobile device via the opening; and
  attaching means in the opening for attaching an external strap to the mobile device; and
 transmitting means for transmitting and receiving communication signals.

22. The mobile device of claim 21 wherein the attaching means for attaching the external strap comprises an attachment member disposed in the opening.

23. The mobile device of claim 22 wherein the attachment member is spaced within the opening such that an open area defined between the attachment member and the housing is of a sufficient size to attach the external strap to the attachment member.

24. The mobile device of claim 21 further comprising channeling means for channeling the audible signals from a speaker disposed within the housing to the port.

25. The mobile device of claim 21 wherein the attaching means is disposed in the opening such that the attaching means is flush with the housing or disposed below an outer edge of the housing.

* * * * *